(12) United States Patent
Takahashi et al.

(10) Patent No.: US 7,042,699 B2
(45) Date of Patent: May 9, 2006

(54) VACUUM VARIABLE CAPACITOR

(75) Inventors: Eiichi Takahashi, Shizuoka (JP);
Toshimasa Fukai, Shizuoka (JP);
Naoki Hayashi, Shizuoka (JP)

(73) Assignee: Kabushiki Kaisha Meidensha, Tokyo (JP)

( * ) Notice: Subject to any disclaimer, the term of this patent is extended or adjusted under 35 U.S.C. 154(b) by 48 days.

(21) Appl. No.: 11/127,289

(22) Filed: May 12, 2005

(65) Prior Publication Data

US 2005/0264974 A1     Dec. 1, 2005

(30) Foreign Application Priority Data

May 28, 2004 (JP) .............................. 2004-158962

(51) Int. Cl.
*H01G 5/00* (2006.01)
(52) U.S. Cl. ...................... 361/277; 361/278; 361/279; 361/282; 361/283.1; 361/292
(58) Field of Classification Search ........ 361/277–279, 361/271, 272, 283.1, 291, 293, 296, 292, 361/298.2
See application file for complete search history.

(56) References Cited

U.S. PATENT DOCUMENTS

| | | | |
|---|---|---|---|
| 4,860,160 A * | 8/1989 | Boksberger et al. ........ | 361/279 |
| 6,268,995 B1 * | 7/2001 | Beuerman et al. .......... | 361/277 |
| 6,307,729 B1 * | 10/2001 | Fukai et al. ................ | 361/303 |
| 6,473,289 B1 * | 10/2002 | Weisse et al. ............. | 361/283.1 |
| 6,498,712 B1 * | 12/2002 | Ditlya ........................ | 361/277 |

FOREIGN PATENT DOCUMENTS

JP         7-78729 A         3/1995

* cited by examiner

*Primary Examiner*—Nguyen T. Ha
(74) *Attorney, Agent, or Firm*—Foley & Lardner LLP

(57) ABSTRACT

A vacuum variable capacitor is includes of a vacuum container which is formed by sealing both end of a cylindrical insulator with a fixed-side end plate and a movable-side end plate, a movable conductive member which is disposed opposite to the fixed-side end plate in the vacuum container, a fixed electrode which is provided on the fixed-side end plate, a movable electrode which is provided on the movable conductive member, a bellows provided in the vacuum container, a rotating portion which is rotatably disposed outside of the vacuum container, and a ball screw through which the movable conductive member is supported by the rotating member.

9 Claims, 4 Drawing Sheets

VACUUM VARIABLE CAPACITOR

BACKGROUND OF THE INVENTION

The present invention relates to a vacuum variable capacitor used in a circuit of a large power oscillator, a high-frequency power-source circuit of a semiconductor equipment and a tank circuit of an induction heating apparatus.

Japanese Published Patent Application No. 7-78729 discloses a vacuum variable capacitor used in an impedance control device of various apparatuses such as a high-frequency power source of a semiconductor equipment or a high-frequency device of a large power oscillator. As shown in FIG. 4, this vacuum variable capacitor has a ceramic insulating cylinder 1 whose both openings are sealed by a fixed-side end plate 4 and a movable-side end plate 5 through connecting cylinders 2 and 3, respectively, so as to form a vacuum container 6. A fixed electrode 7 is provided by coaxially connecting a plurality of cylindrical electrode plates 7a, which are different in diameter with each other, to an inner surface of the fixed-side end plate 4. A movable electrode 9 is provided by coaxially connecting a plurality of cylindrical electrode plates 9a to a movable conductive member 8. The cylindrical electrode plates 9a are different with each other and from the cylindrical electrode plates 7a of the fixed electrode 7 in diameter so that the cylindrical electrode plates 9a can be inserted into and drawn from a space between the cylindrical electrode plates 7a with no contact therebetween.

The movable conductive member 8 comprises a hollow lead portion 8a which protrudes in the opposition direction of the movable electrode 8. An outer periphery of the hollow lead portion 8a is slidably supported by a cylindrical bearing 10 engaged and fixed to a center hole 5a of the movable-side end plate 5. A female thread 8b is formed at a closed end of the hollow lead portion 8a. A capacitance control screw 11 comprises a head portion 11a and a male thread 11b screwed with the female thread 8b. A screw receiving portion 12 is formed at an outer periphery of the hole 5a of the movable-side end plate 5. The capacitance control screw 11 is rotatably supported by the screw receiving portion 12 through a thrust bearing 13 for reducing a rotational torque of the capacitance control screw 11. By rotating the head portion 11a by means of a manual operation or motor drive, the movable conductive member 8 is vertically moved. According to this vertical movement, a total opposing area between the electrodes 7 and 9 is varied, and therefore the capacitance of the capacitor is varied. Accordingly, the impedance is controlled by this rotation of the head portion 11a.

A cylindrical bellows 14 is made of soft metal and is disposed inside of the vacuum container 6. An end of the bellows 14 is connected to the movable-side end plate 5 and the bearing 10, and the other end of the bellows 14 is connected to the movable conductive member 8 so that the movable conductive member 8 and the movable electrode 9 can be vertically movable while keeping the sealing capacity of the vacuum container 6. Since the hollow lead portion 8a is insulated from the bearing 10 by mean of lubricating oil, an electricity flows through the hollow lead portion 8a to the bellows 14 in the vacuum container 6. That is, the bellows 14 functions as an electricity flowing path between an outer power source terminal (not shown) connected to the movable side end plate 5 and the movable conductive member 8. Accordingly, the high frequency current flows, for example, from the fixed-side end plate 4 to the movable-side end plate 5 through the capacitance between the movable conductive member 8 and the electrodes 7 and 9.

Lately, a load of a high frequency equipment has increased, and a vacuum variable capacitor for the equipment has become large to enable a large current flow according the increase of the high-frequency current. Therefore, a rotational torque of a capacitance control screw of the vacuum variable capacitor has also increased.

SUMMARY OF THE INVENTION

In order to move the movable conductive member 8 against the vacuum pressure in the vacuum container 6, it is necessary to employ a large-driving-force generative motor. Accordingly it is necessary to increase the required power of the motor according to the increase of the capacitance of the vacuum variable capacitor. Specifically, when the movable conductive member 8 is moved toward a direction that the opposing area between the electrodes 7 and 9 is decreased against the vacuum pressure, a large driving force is required, and therefore the vacuum variable capacitor and the driving section of the motor have upsized in capacity.

Further, when the female thread 8b of the hollow lead portion 8a is moved along the male thread 11b according to the rotation of the capacitance control screw 11, the male thread 11b receives a friction resistance force and the vacuum pressure. Therefore, there is a possibility that the male thread 11b is worn and/or deformed with use. If the male thread 11b is worn and/or deformed, there is a possibility that the friction resistance force of the male thread 11b is further increased and therefore the rotational torque of the capacitance control screw 11 is also increased. Furthermore, if the male thread 11b is worn and/or deformed, the position of the movable electrode 9 relative to the rotation of the capacitance control screw 11 is displaced according to the wear and/or deformation of the male thread 11b, and there is caused a possibility that the capacitance relative to the position of the capacitance control screw 11 is changed.

It is therefore an object of the present invention to provide an improved vacuum variable capacitor which is capable of preventing the error of the capacitance due to the wear and/or deformation of the male and female threads for a control screw, of suppressing the increase of the rotational torque required during the control of the capacitance and of decreasing the size of a driving section for executing the control of the capacitance.

An aspect of the present invention resides in a vacuum variable capacitor which comprises a vacuum container formed by sealing both end of a cylindrical insulator with a fixed-side end plate and a movable-side end plate; a movable conductive member disposed opposite to the fixed-side end plate in the vacuum container, the movable conductive member extending from an inside of the vacuum container to an outside of the vacuum container, the movable conductive member being movable along a center axis of the vacuum container; a fixed electrode provided on the fixed-side end plate; a movable electrode provided on the movable conductive member; a first bellows provided in the vacuum container, an end of the first bellows being connected to the movable-side end plate, the other end of the first bellows being connected to the movable conductive member; a rotating portion rotatably disposed outside of the vacuum container; and a ball screw through which the movable conductive member is supported by the rotating portion so as to move along the axis direction of the vacuum container according to a rotation of the rotating portion.

The other objects and features of this invention will become understood from the following description with reference to the accompanying drawings.

DETAILED DESCRIPTION OF THE INVENTION

Figure 1:
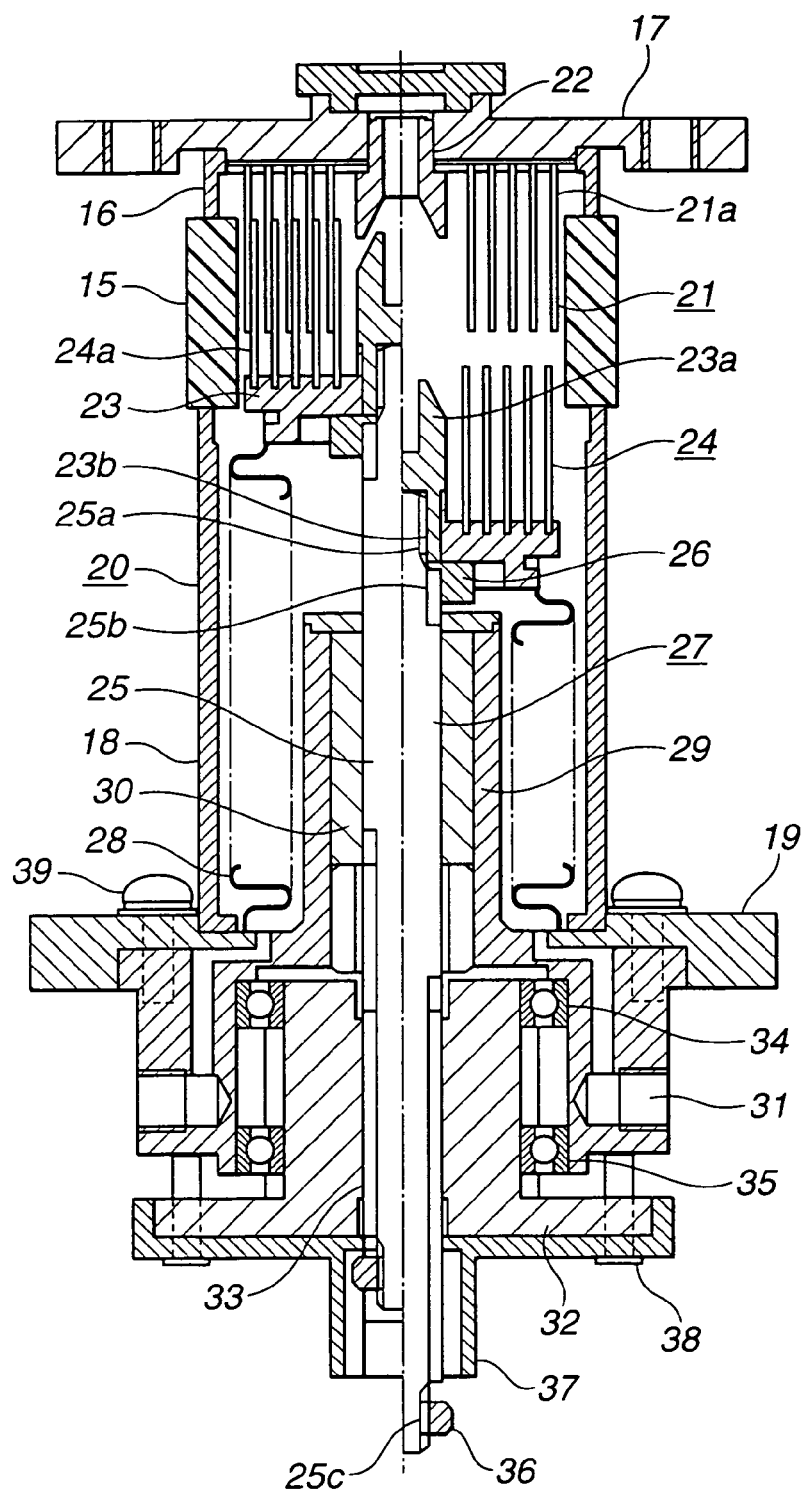
FIG. 1 is a cross sectional view showing a vacuum variable capacitor according to a first embodiment of the present invention.
Figure 2:
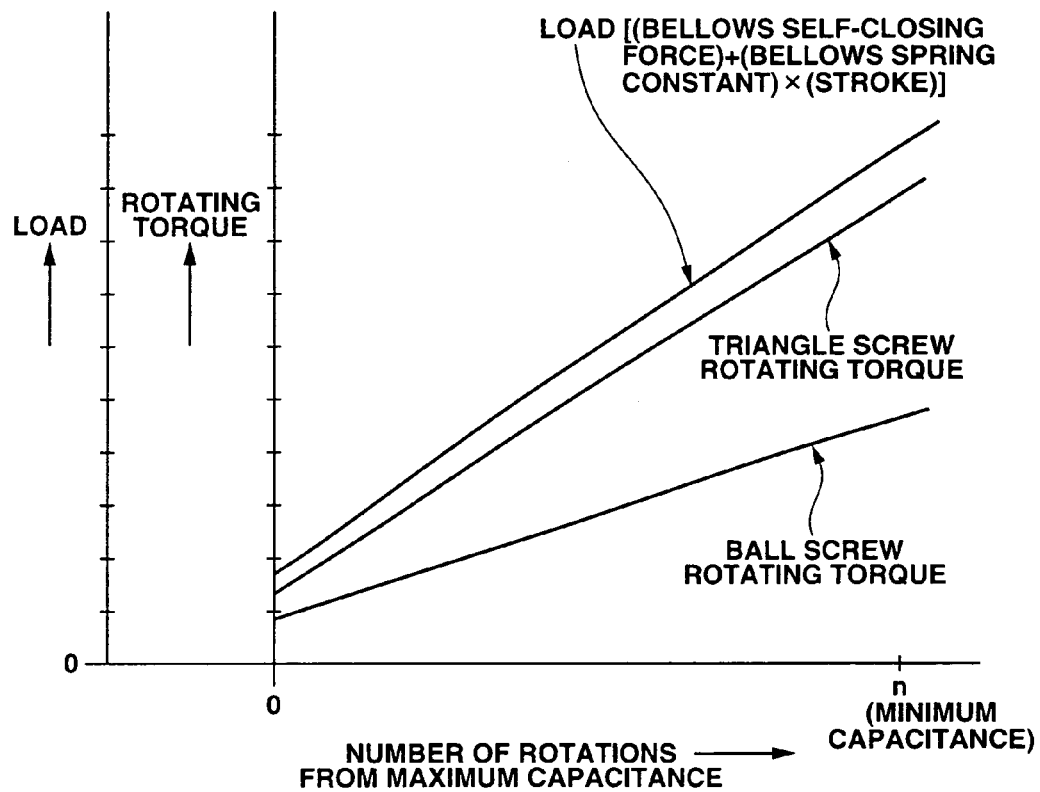
FIG. 2 is a graph showing a relationship among the number of the rotations of a slide shift, a load and a rotational torque of the vacuum variable capacitor of FIG. 1.

Referring to FIGS. 1 and 2, there is discussed a vacuum variable capacitor according to a first embodiment of the present invention.

As shown in FIG. 1, a cylindrical insulator 15 made of ceramic is connected to a fixed-side plate 17 and a movable-side end plate 19. More specifically, an end of the cylindrical insulator 15 is connected to the fixed-side end plate 17 through a connecting cylinder 16 made of metal, and the other end of the cylindrical insulator 15 is connected to the movable-side end plate 19 through a connecting cylinder 18, so as to form a vacuum container 20. The cylindrical insulator 15 is provided to insulate the end plates 17 and 19, and the end plates 17 and 19 also serve as external terminals.

A fixed electrode 21 is provided by coaxially connecting a plurality of cylindrical electrode plates 7a, which are different in diameter with each other, to an inner surface of the fixed-side end plate 17. An electrode guide 22 is installed at a center of the inner surface of the fixed-side end plate 17. An inner end of the electrode guide 22 has a depression formed into a inversed cone shape.

A movable electrode 24 is provided by coaxially connecting a plurality of cylindrical electrode plates 24a, which are different in diameter with each other, on a movable electrode supporting plate 23 disposed opposite to the fixed-side end plate 17 in the vacuum container 20 so that the cylindrical electrode plates 24a can be inserted into and drawn from the space between the cylindrical electrode plates 21a with no contact therebetween. A projecting portion 23a having a cone-shaped tip end is formed at a center of the movable electrode supporting plate 23 to be opposite to the electrode guide 22. A female thread portion 23b is formed at a center of the movable electrode supporting plate 23. A two stepped thread portion constructed by a small male thread portion 25a and a large male thread portion 25b is formed at an end of a sliding shaft 25. The small male thread portion 25a is screwed with the female thread portion 23b, and the large male thread portion 25b is screwed with a stopper screw 26. Thus, the end of the sliding shaft 25 is mechanically connected to the movable electrode supported plate 23 without employing a brazed joint. A movable conductive member 27 is thus constructed by the movable electrode supporting plate 23 and the slide shaft 25. By contacting the electrode guide 22 and the projecting portion 23a, the full overlap between the fixed electrode 21 and the movable electrode 24 is prevented.

A first bellows 28 made of soft metal is disposed in the vacuum container 20. More specifically, an end of the first bellows 28 is connected to the movable electrode supporting plate 23 and the other end of the first bellows 28 is connected to the movable-side end plate 19 in the vacuum container 20, so as to divide the vacuum container 20 into a vacuum space and an atmospheric space. The first bellows 28 also serves as an electricity flowing path. A cylindrical heat sink 29 is engaged with a center hole of the movable-side end plate 19 within the first bellows 28 and is fixed to the movable-side end plate 19 by means of bolts 39 so as to support an outer peripheral side of a cylindrical slide guide 30 for slidably guiding the slide shaft 25. By the sliding between the slide shaft 25 and the slide guide 30, the movable electrode 24 is moved along the center axis of the vacuum container 20. By employing cupper, stainless steel, or a direct-drive type linear bushing of a hardened ball slides for the slide guide 30, it becomes possible to accurately move the movable electrode 24 in parallel with the center axis of the vacuum container 20. The heat sink 29 has air holes 31 for communicating the atmospheric side in the vacuum container 20 with an external side to prevent an inner temperature of the vacuum variable capacitor from being raised.

A rotating portion 32 is connected to the slide shaft 25 outside of the vacuum container 20 through a ball screw portion 33. The ball screw portion 33 constructed by a ball nut formed on the rotating portion 32 and a ball bush formed on the slide shaft 25. The ball nut of the rotating portion 32 has a semi-circular helical groove in which balls run and re-circulate. The ball bush of the slide shaft 25 is a shaft with a groove on which the balls run and re-circulate.

A rotation rod 37 is attached to the rotating portion 32 by means of bolts 38 and is rotated by the driving section such as a motor. A plurality of bearings 34 and 35 are disposed between the heat sink 29 and the rotating portion 32 to decrease the rotational torque of the rotating portion 32 and to suppress the lateral load to the rotating portion 32 from being applied to the inside parts of the vacuum variable capacitor. A control nut 36 is screwed with a male thread portion 25c provided at a lower end of the slide shaft 25 so as to limit the upward movement of the slide shaft 25. That is, the control nut 36 is attached to the lower end of the slide shaft 25 so that when the vacuum variable capacitor is set at the maximum capacitance state by the upward movement of the slide shaft 25, the control nut 36 is contacted with the rotating rod 37 to limit the further upward movement of the slide shaft 25. The control of the capacitance of the vacuum variable capacitor is executed by vertically moving the slide shaft 25 to vertically move the movable electrode 24 along a center axis of the vacuum container 20. The vertical movement is achieved by rotating the rotating portion 32 through the rotation rod 37 by means of the driving section such as the motor.

With the thus arranged vacuum variable capacitor according to the first embodiment of the present invention, since the movable conductive member 27 and the rotating portion 32 rotatably driven by the driving portion are connected through the ball screw portion 33, it is possible to decrease the rotational torque of the ball screw portion 33. Therefore, it becomes possible to move the movable electrode 24 against the vacuum pressure under the low friction force condition due to the ball screw portion 33 and to decrease the size of the driving section. Further since it is possible to rotate the rotating portion 32 with the low friction force, it becomes possible to prevent the wear and/or deformation of the ball screw portion 33 and to suppress the increase of the rotational torque. This elongates the life of the rotating portion 32. Further the relationship between the rotational position of the slide shaft 25 and the position of the movable electrode 24 is maintained so as to prevent the generation of error of the capacitance of the vacuum variable capacitor. Furthermore, since it is possible to rotate the rotating portion 32 with the low friction force, it becomes possible to rotate the slide shaft 25 at high speed. This enables the high speed capacitance control.

FIG. 2 shows a relationship among the number of the rotations of the slide shaft 25 from the maximum capacitance position, a load:(load)=(bellows self closing force)+(bellows spring constant)×(stroke) and the rotational torque. The graph of FIG. 2 clearly shows that the rotational torque in case of the ball screw is smaller than that in case of a triangle screw. A rotational torque of the triangle screw is obtained from the following expression (1).

$$T=(Q/2) \times (dz \times \tan(\rho+\beta)+dw+\mu w) \quad (1)$$

where Q is a load, dz is an effective diameter, ρ is a friction angle, β is a lead angle, dw is a nut seat diameter, and μw is a seat surface.

On the other hand, a rotational torque of the ball screw is obtained from the following expression (2).

$$T=pL(1-\mu \tan \beta)/2\pi(1+\mu \tan \beta) \quad (2)$$

where p is a load, L is a lead of the ball screw, μ is a friction coefficient, and β is a lead angle.

Since the movable conductive member 27 is constructed by the movable electrode supporting plate 23 ad the slide shaft 25 which are mechanically connected without employing the brazing, the thermal conductivity from the movable electrode supporting plate 23 to the slide shaft is lowered. This decreases the heat transfer to the sliding portion and therefore increases the life of the sliding portion. Further since the slid shaft is slidably supported by the slide guide 30, it becomes possible to smoothly and straightly moved the movable conductive member 27. This decreases the rotational torque of the rotating portion 32.

Since the plurality of the bearings 34 and 35 are provided between the rotating portion 32 and the vacuum container 20, it becomes possible to decrease the rotational torque of the rotating portion 32. Further since the control nut 36 is attached to the slide shaft 25 to control the maximum capacitance, it becomes possible to easily control the maximum capacitance of the vacuum conductive capacitor. Furthermore, since the air holes 31 are provided so as to communicate the atmospheric side of the vacuum container 20 and the external, the temperature of the vacuum container 20 is lowered and therefore the life of the vacuum variable capacitor is improved.

Figure 3:
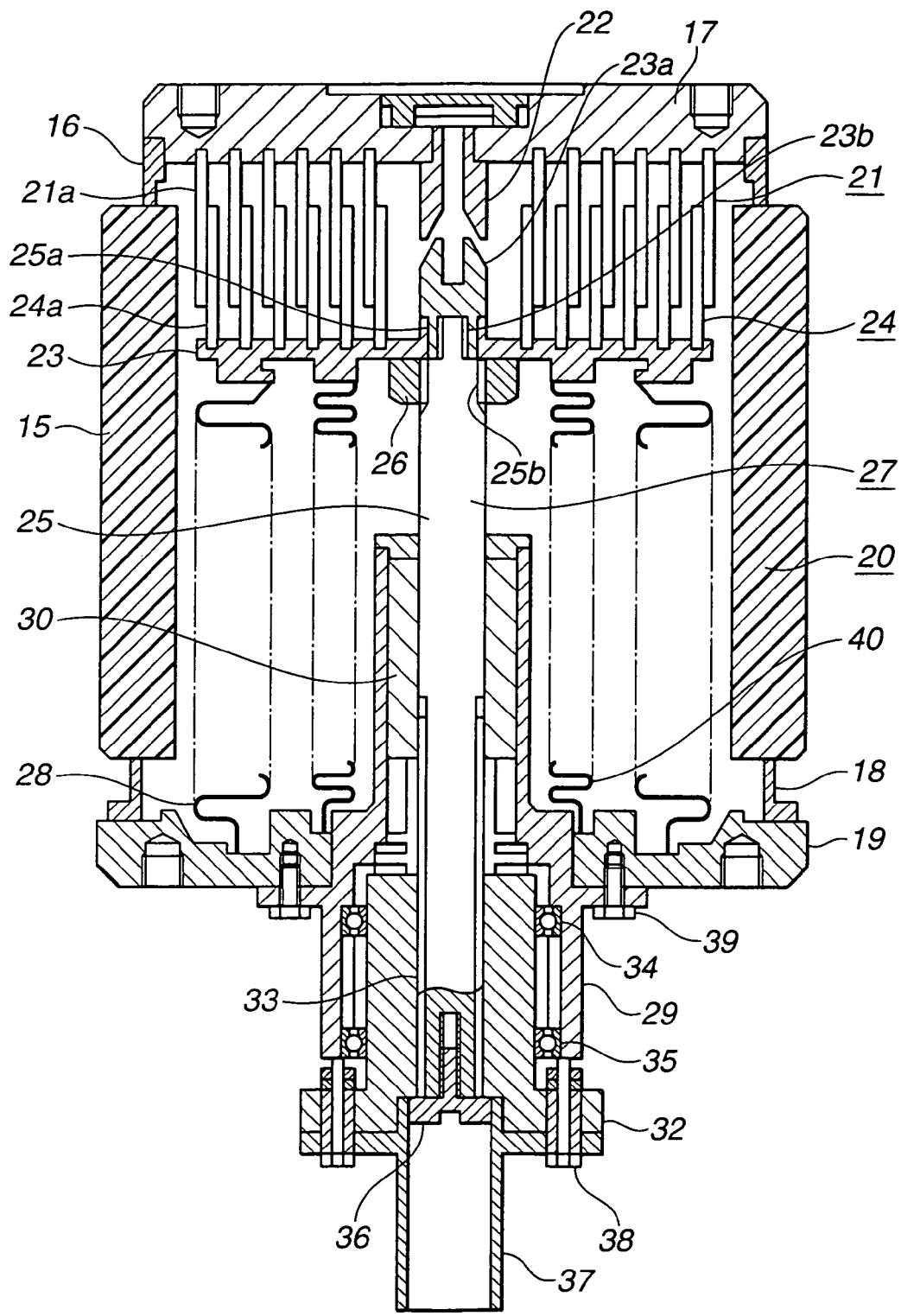
FIG. 3 is a cross sectional view showing the vacuum variable capacitor according to a second embodiment of the present invention.
Figure 4:
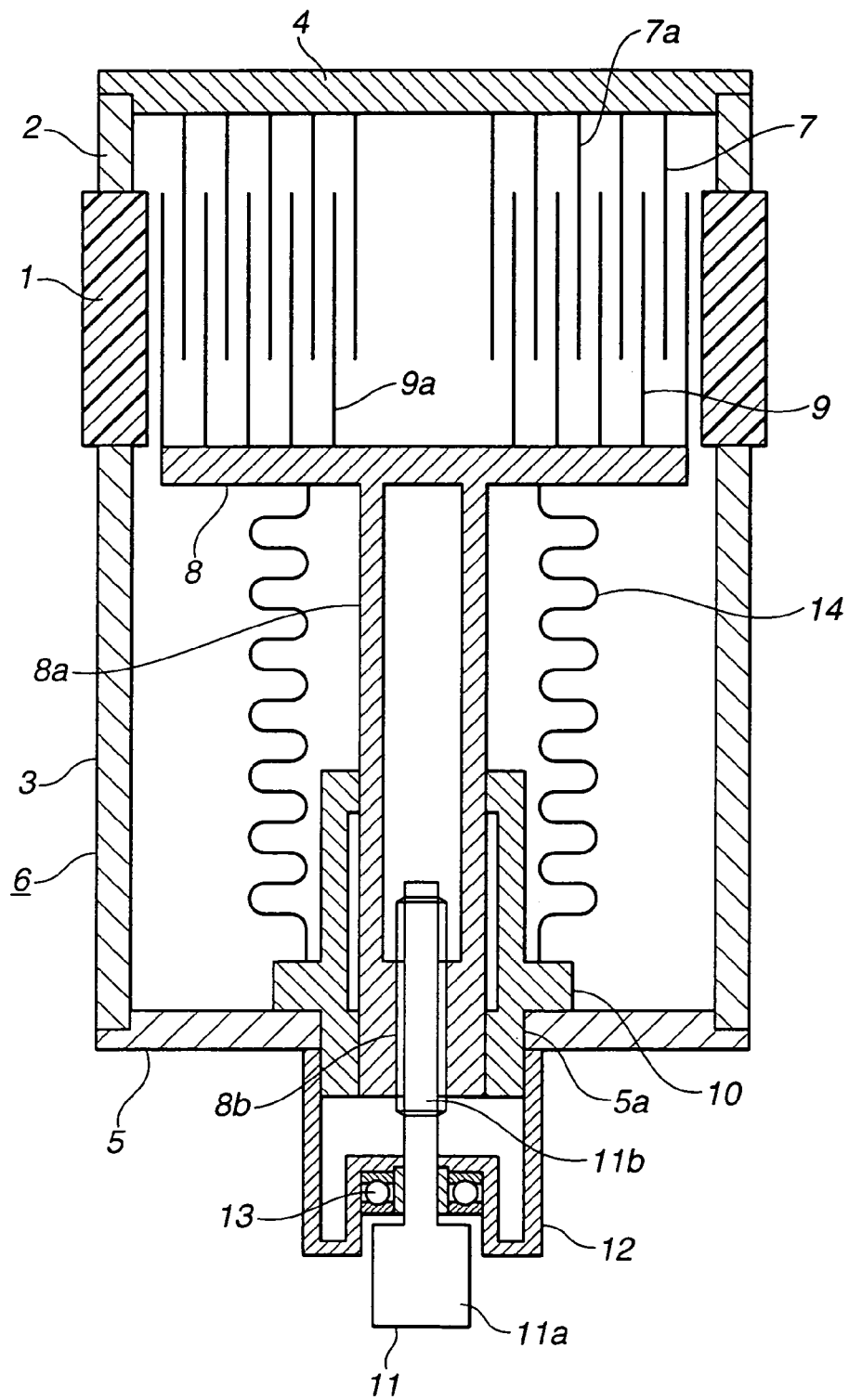
FIG. 4 is a cross sectional view showing a conventional vacuum variable capacitor.

Referring to FIG. 3, there is discussed the vacuum variable capacitor according to a second embodiment of the present invention.

A cylindrical second bellows 40 is disposed inside of the first bellows 28 such that an end of the second bellows 40 is connected to the movable electrode supporting plate 23 and the other end of the second bellows 40 is connected to the movable-side end plate 19. The second bellows 40 divides the space of the vacuum container 20 into the vacuum side and the atmospheric side and also serves as an electricity flowing path. A control screw 36 is screwed in a female thread portion 25d formed at a lower end of the slide shaft 25. The other construction of the second embodiment is the same as that of the first embodiment except that the vacuum variable capacitor of the second embodiment does not have the air holes 31.

With the thus arranged second embodiment according to the present invention, since the second bellows 40 is smaller in diameter than the first bellows 28, the self closing force generated by the pressure difference between the vacuum side and the atmospheric side of the vacuum container 20 becomes small. This further decreases the rotational torque of the rotating portion 32, and the provision of two bellows 28 and 40 increases the quantity of the allowable electricity flowing. The other advantages of the second embodiment are similar to those of the first embodiment.

This application is based on a prior Japanese Patent Application No. 2004-158962. The entire contents of the Japanese Patent Application No. 2004-158962 with a filing date of May 28, 2004 are hereby incorporated by reference. The scope of the invention is defined with reference to the following claims.

What is claimed is:

1. A vacuum variable capacitor comprising:
   a vacuum container formed by sealing both end of a cylindrical insulator with a fixed-side end plate and a movable-side end plate;
   a movable conductive member disposed opposite to the fixed-side end plate in the vacuum container, the movable conductive member extending from an inside of the vacuum container to an outside of the vacuum container, the movable conductive member being movable along a center axis of the vacuum container;
   a fixed electrode provided on the fixed-side end plate;
   a movable electrode provided on the movable conductive member;
   a first bellows provided in the vacuum container, an end of the first bellows being connected to the movable-side end plate, the other end of the first bellows being connected to the movable conductive member;
   a rotating portion rotatably disposed outside of the vacuum container; and
   a ball screw through which the movable conductive member is supported by the rotating portion so as to move along the axis direction of the vacuum container according to a rotation of the rotating portion.

2. The vacuum variable capacitor as claimed in claim 1, wherein the movable conductive member comprises a movable electrode supporting plate on which the movable electrode is provided and a slide shaft which extends from the movable electrode to the movable-side end plate, the movable electrode supporting plate and the slide shaft being mechanically connected.

3. The vacuum variable capacitor as claimed in claim 1, wherein the movable conductive member comprises a movable electrode supporting plate on which the movable electrode is provided and a slide shaft which extends from the movable electrode to the movable-side end plate, wherein a slide guide for slidably supporting the slide shaft is provided in the vacuum container.

4. The vacuum variable capacitor as claimed in claim 1, further comprising a plurality of bearings through which the rotating portion is rotatably supported by the vacuum container.

5. The vacuum variable capacitor as claimed in claim 1, further comprising a maximum capacitance controlling means for controlling a maximum capacitance of the vacuum variable capacitor, the maximum capacitance controlling means being attached to an external end portion of the conductive movable member.

6. The vacuum variable capacitor as claimed in claim 1, further comprising a hole for communicating an atmospheric side in the vacuum container and an external of the vacuum container.

7. The vacuum variable capacitor as claimed in claim 1, further comprising a second bellows which is disposed inside of the first bellows, an end of the first bellows being connected to the movable conductive member, the other end of the first bellows being connected to the movable conductive member.

8. The vacuum variable capacitor as claimed in claim 1, wherein the first bellows is made of electricity conductive material.

9. The vacuum variable capacitor as claimed in claim 1, wherein the first bellows and the second bellows are made of electricity conductive material.

* * * * *